United States Patent
Kurokawa et al.

(10) Patent No.: US 9,313,448 B2
(45) Date of Patent: Apr. 12, 2016

(54) DISPLAY APPARATUS AND DISPLAY METHOD

(71) Applicant: Japan Display Inc., Tokyo (JP)

(72) Inventors: Soichiro Kurokawa, Kanagawa (JP); Koji Noguchi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 307 days.

(21) Appl. No.: 13/754,460

(22) Filed: Jan. 30, 2013

(65) Prior Publication Data

US 2013/0215333 A1 Aug. 22, 2013

(30) Foreign Application Priority Data

Feb. 17, 2012 (JP) ................................ 2012-032356

(51) Int. Cl.
  *H04N 5/66* (2006.01)
  *G06F 1/32* (2006.01)
  *G06F 3/041* (2006.01)
  *G06F 3/044* (2006.01)

(52) U.S. Cl.
  CPC ............... *H04N 5/66* (2013.01); *G06F 1/3265* (2013.01); *G06F 3/044* (2013.01); *G06F 3/0412* (2013.01); *Y02B 60/1242* (2013.01)

(58) Field of Classification Search
  CPC . H04N 5/66; H04N 13/0497; H04N 13/0055; H04N 5/06; H04N 5/783; H04N 21/4334; H04N 5/775; H04N 5/23267; H04N 5/23277; H04N 5/76; H04N 5/2327; H04N 5/444; H04N 5/4448; G11B 20/10; G11B 2020/1062; G11B 7/14
  See application file for complete search history.

(56) References Cited

U.S. PATENT DOCUMENTS

| | | | | |
|---|---|---|---|---|
| 6,430,363 | B2 * | 8/2002 | Sasaki et al. | 386/328 |
| 7,236,206 | B2 * | 6/2007 | Yasui et al. | 348/458 |
| 8,295,361 | B2 * | 10/2012 | Tseng et al. | 375/240.24 |
| 2002/0180746 | A1 | 12/2002 | Yasui et al. | |
| 2006/0201931 | A1 * | 9/2006 | Lee et al. | 219/497 |

FOREIGN PATENT DOCUMENTS

| | | |
|---|---|---|
| JP | 07-134275 | 5/1995 |
| JP | 07-182107 | 7/1995 |
| JP | 2009-244958 | 10/2009 |

(Continued)

OTHER PUBLICATIONS

Japanese Office Action issued in connection with Japanese Patent Application No. 2012-032356, dated Feb. 24, 2015. (7 pages).
Taiwan Office Action issued in connection with Taiwan Patent Application No. 101141937, dated Feb. 26, 2015. (12 pages).

(Continued)

*Primary Examiner* — Gregory J Tryder
*Assistant Examiner* — Yuehan Wang
(74) *Attorney, Agent, or Firm* — K&L Gates LLP

(57) ABSTRACT

A display apparatus includes: a display that displays a screen corresponding to a video signal; a write unit that writes the video signal into a memory at a predetermined writing speed; and a read unit that reads the video signal which is written into the memory at a reading speed which is different from the writing speed, and that displays the read video signal on the display, wherein the memory has a capacity which is smaller than the video signal of 1 frame, includes a write address and a read address, the addressing of which is formed in a ring shape, and independently writes and reads the video signal at different speeds.

2 Claims, 17 Drawing Sheets

(56) References Cited

FOREIGN PATENT DOCUMENTS

| | | |
|---|---|---|
| TW | 498296 | 8/2002 |
| TW | I245253 | 12/2005 |

OTHER PUBLICATIONS

Japanese Office Action issued on May 12, 2015, for corresponding Japanese Appln. No. 2012-032356 (7 pages).

* cited by examiner

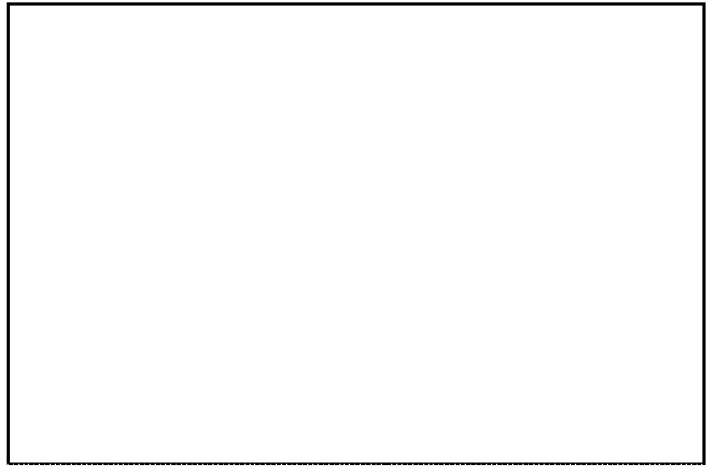
FIG.7C SCREEN DISPLAY
FIG.7B MEMORY
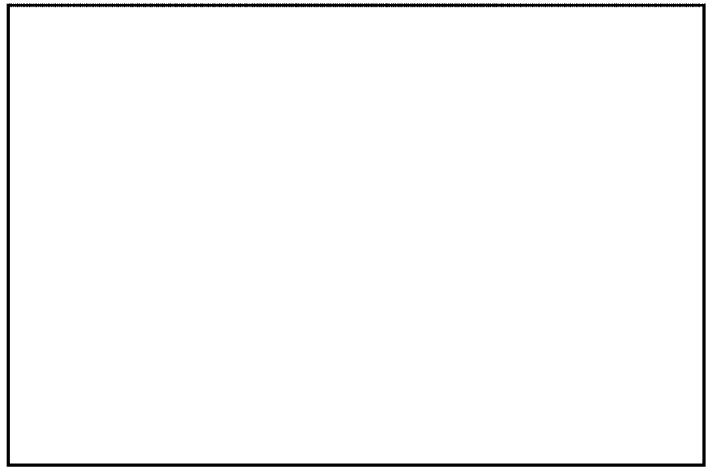
FIG.7A INPUT IMAGE

SCREEN DISPLAY

MEMORY

INPUT IMAGE

SCREEN DISPLAY

MEMORY

CAPACITY OF 10% OF 1 FRAME

INPUT IMAGE

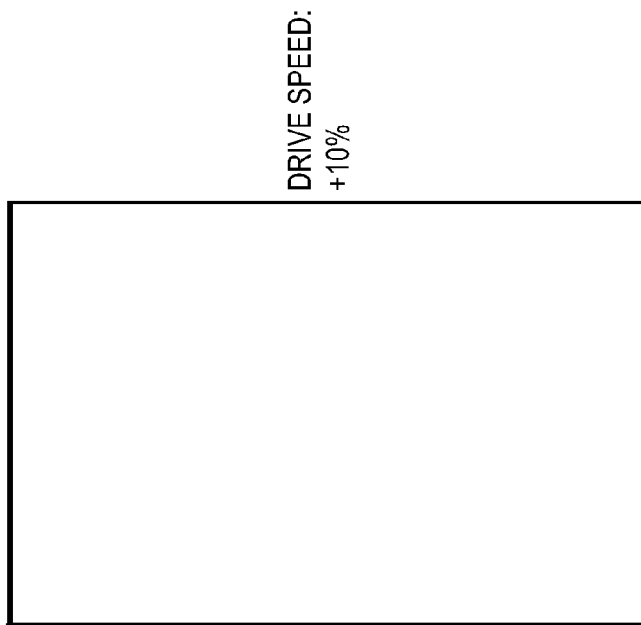
FIG.10C — SCREEN DISPLAY (DRIVE SPEED: +10%)
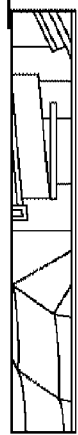
FIG.10B — MEMORY
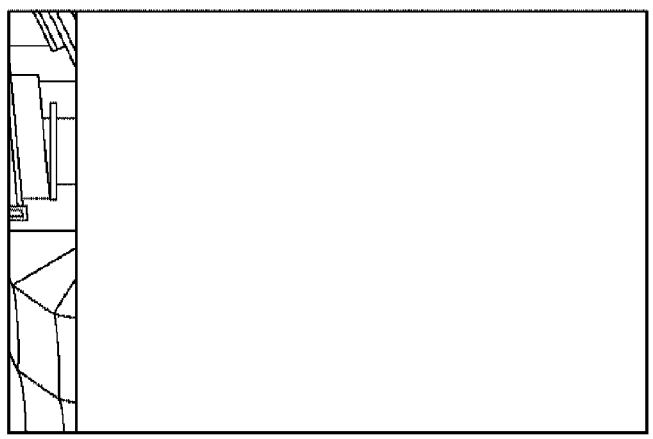
FIG.10A — INPUT IMAGE

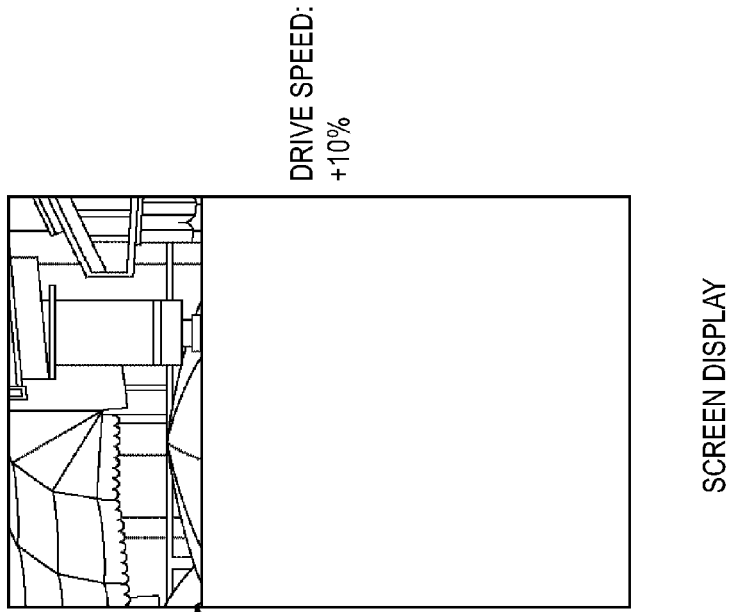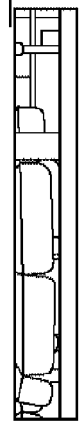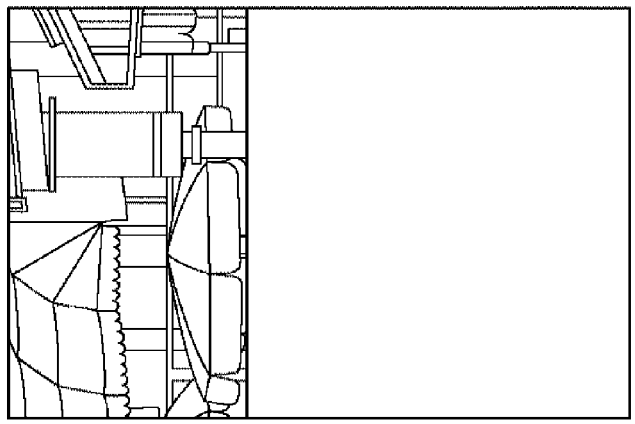

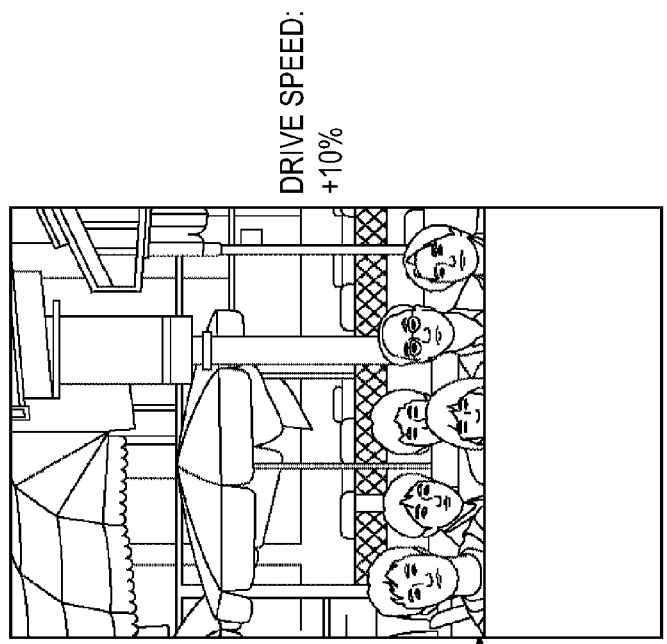
FIG.12A INPUT IMAGE
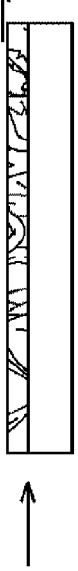
FIG.12B MEMORY
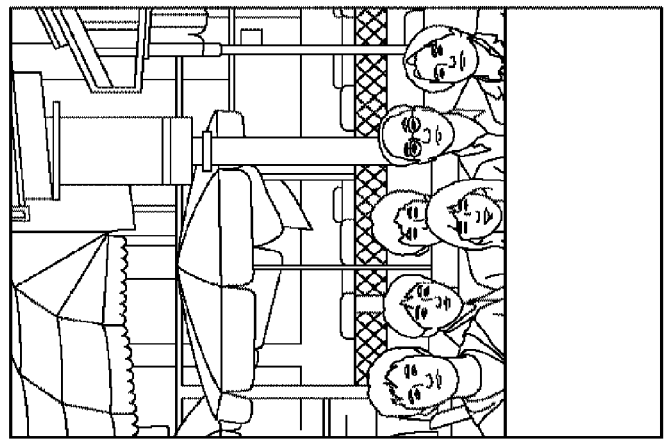
FIG.12C SCREEN DISPLAY
DRIVE SPEED: +10%

DRIVE SPEED: +10%

SCREEN DISPLAY

MEMORY

INPUT IMAGE

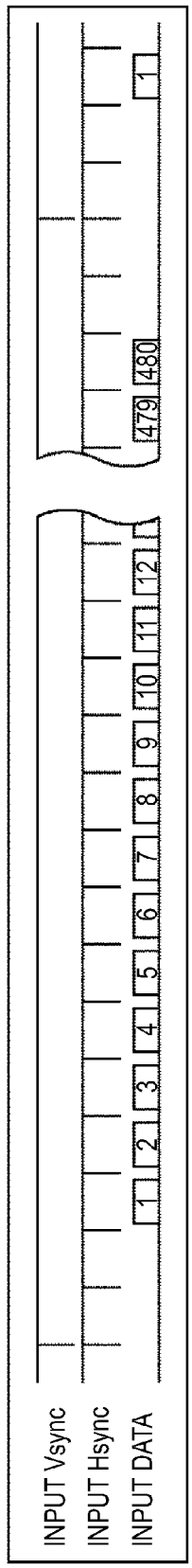
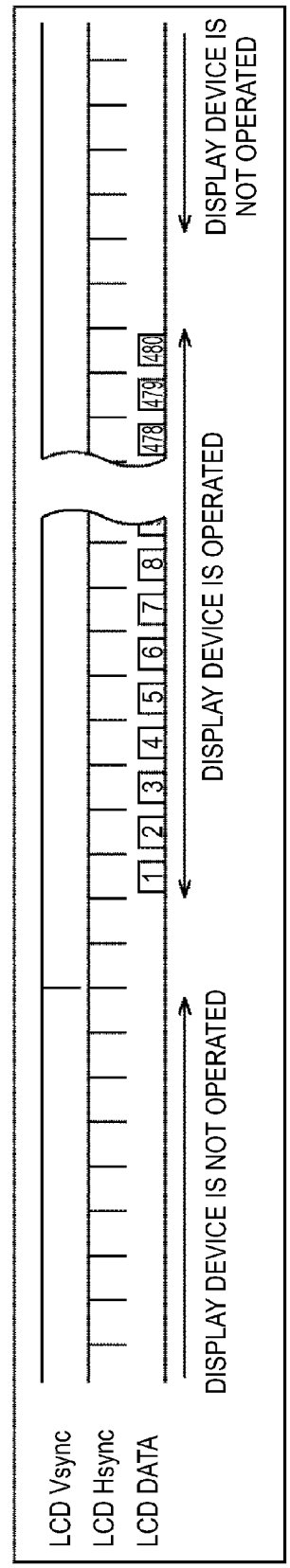

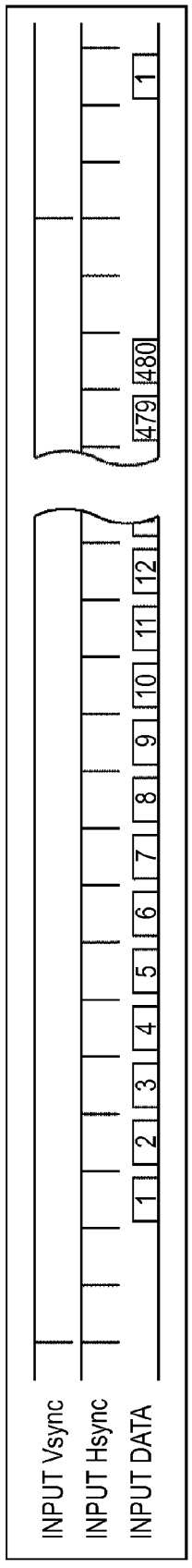
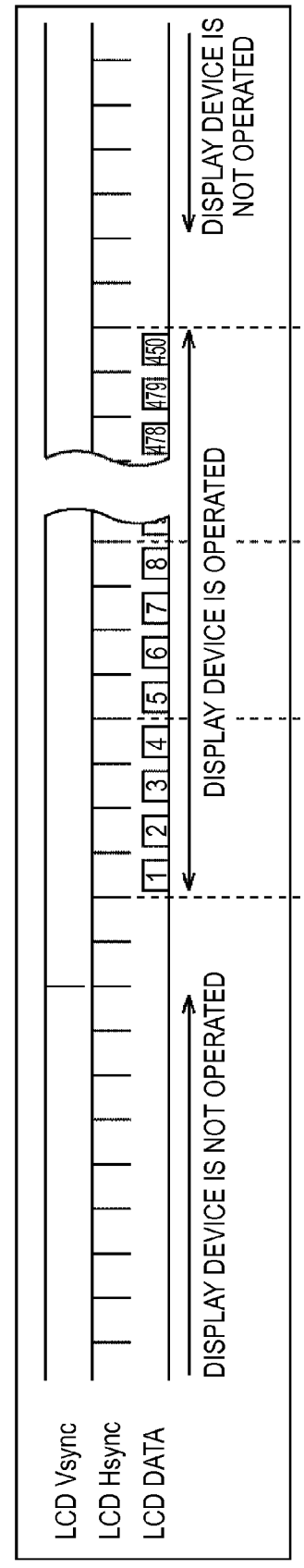
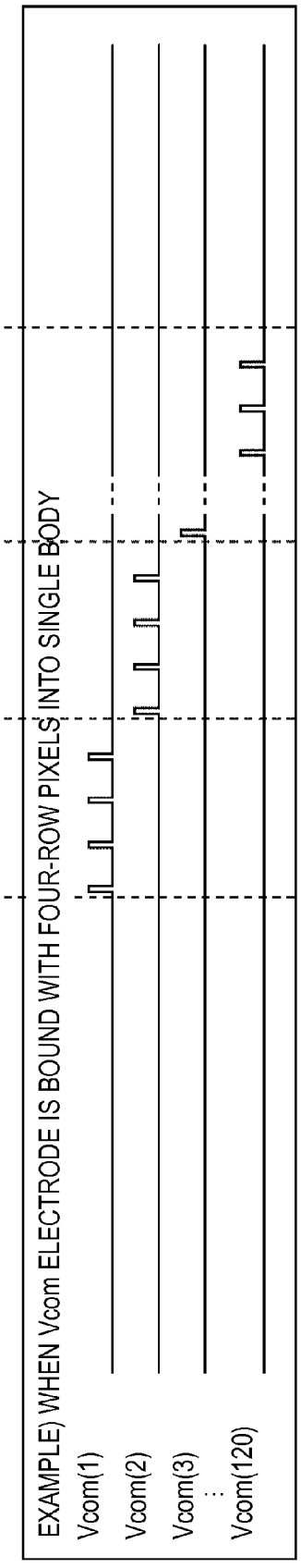

DISPLAY APPARATUS AND DISPLAY METHOD

CROSS REFERENCES TO RELATED APPLICATIONS

The present application claims priority to Japanese Priority Patent Application JP 2012-032356 filed in the Japan Patent Office on Feb. 17, 2012, the entire content of which is hereby incorporated by reference.

BACKGROUND

The present disclosure relates to a display apparatus and a display method, and, in particular, to a display apparatus and a display method in which the length of the blanking interval of a video signal can be adjusted.

In related art, there is a display apparatus in which various types of operational buttons or the like are displayed on a display in such a way that a touch panel is superimposed on the display or that the display is integrated with the touch panel, and which enables operational input to be performed on the display by detecting the operation of a user who touches the display.

Since such a display apparatus does not need operational buttons as hardware, the display apparatus is widespread in portable information terminals, such as a tablet computer and a smart phone.

As a touch panel operation detection method used for the portable information terminals, a capacitance type has been known which has a comparatively simple configuration and the power consumption of which is low.

Here, the basic principal of a capacitance type touch panel is described with reference to FIGS. 1A to 3B.

FIGS. 1A and 2A show the basic configurations of the capacitance type touch panel, and FIGS. 1B and 2B are the respective equivalent circuits thereof.

That is, in the capacitance type touch panel, a dielectric material D is interposed between a pair of detection electrodes E1 and E2 which are arranged to face each other, thus a capacitance device C1 is formed. One end of the capacity device C1 is connected to an Alternating-Current (AC) signal source (drive signal source) S, and the other end P is connected to a voltage detector DET while being grounded via a resistor R.

If a finger of the user comes into contact with (or approaches) the detection electrode E2 as shown in FIG. 2A, a capacity device C2 which is formed by the finger is added to the capacity device C1 in series.

FIGS. 3A and 3B show the AC square wave Sg of a predetermined frequency which is applied from the AC signal source S to the detection electrode E1, and an output waveform (touch detection signal Vdet) which is detected using the detection electrode E2 according thereto. In addition, the AC square wave Sg corresponds to a touch detection drive signal Vcomt which will be described later.

As shown in FIGS. 1A and 1B, in a state in which a finger does not come into contact with the detection electrode E2, current $I_0$ based on the capacitance value of the capacity device C1 flows in accordance with the charge and discharge of the capacity device C1. The potential waveform of the other end P of the capacity device C1 at this time is, for example, the waveform $V_0$ shown in FIG. 3A, and this is detected using the DET.

Meanwhile, as shown in FIGS. 2A and 2B, in a state in which a finger comes into contact with the detection electrode E2, currents $I_1$ and $I_2$ respectively flow in accordance with the charge and discharge of the capacity devices C1 and C2. The potential waveform of the other end P of the capacity device C1 at this time is, for example, the waveform $V_1$ shown in FIG. 3A, and this is detected using the DET. At this time, the potential of a point P is partial pressure potential which is determined based on the value of the currents $I_1$ and $I_2$ which flow through the capacity devices C1 and C2. Therefore, the value of the waveform $V_1$ is smaller than that of the waveform $V_0$ in the non-contact state. Here, the DET implements the touch detection in such a way as to determine the non-contact state if the detected voltage is equal to or higher than a predetermined threshold voltage $V_{th}$ and determine the contact state if the detected voltage is lower than the predetermined threshold voltage $V_{th}$.

In addition, when the touch panel is combined with the display, the configuration can be simplified by using the common electrode for the display as one of the above-described pair of detection electrodes E1 and E2 (for example, refer to JP-A-2009-244958).

SUMMARY

However, as described above, when the common electrode of the display for displaying is used as one of the pair of detection electrodes, a drive signal which flows into the common electrode and which is related to the display of the display may be noise from the viewpoint of touch detection. Therefore, in order to stabilize the accuracy of the touch detection, it is preferable that a touch detection drive signal Vcomt be applied for the touch detection in a blanking period during which the drive signal which is related to the display of the display does not flow.

In addition, in the capacitance type touch panel, the body of the user functions as an antenna, thus external noise (attributable to inverter fluorescence, AM (Amplitude Modulation) waves, AC power source, or the like) may be dispersed. In this case, if the external noise interferes with the touch detection drive signal Vcomt, the accuracy of the touch detection is affected. Therefore, it is preferable to vary the frequency of the touch detection drive signal Vcomt so that the touch detection drive signal is not interfered by the external noise.

In addition, in the blanking period, it is necessary to enable the length of the blanking period to be adjusted in order to change the frequency of the touch detection drive signal Vcomt.

It is therefore desirable to enable the blanking period of the video signal to be adjusted.

An embodiment of the present disclosure is directed to a display apparatus including: a display that displays a screen corresponding to a video signal; a write unit that writes the video signal into a memory at a predetermined writing speed; and a read unit that reads the video signal which is written into the memory at a reading speed which is different from the writing speed, and that displays the read video signal on the display. The memory has a capacity which is smaller than the video signal of 1 frame, includes a write address and a read address, the addressing of which is formed in a ring shape, and independently writes and reads the video signal at different speeds.

The read unit may read the video signal which is written into the memory at the reading speed which is faster than the writing speed, and may display the video signal on the display.

When the capacity of the memory is M % of the video signal of the 1 frame, the read unit may read the video signal which is written into the memory at a reading speed which is increased by M % of the writing speed, and may display the video signal on the display.

The display apparatus according to the embodiment of the present disclosure may further include a detection unit that is layered on the display, and that detects a touch operation performed by a user. The detection unit may detect the touch operation in a blanking period which occurs because the read unit reads the video signal which is written into the memory at a reading speed which is faster than the writing speed, and may display the video signal on the display.

Another embodiment of the present disclosure is directed to a display method of a display apparatus which includes a display that displays a screen corresponding to a video signal, including: allowing the display apparatus to write the video signal into a memory at a predetermined writing speed, and read the video signal which is written into the memory at a reading speed which is different from the writing speed, and displaying the read video signal on the display. The memory has a capacity which is smaller than the video signal of 1 frame, includes a write address and a read address, the addressing of which is formed in a ring shape, and independently writes and reads the video signal at different speeds.

According to the embodiments of the present disclosure, the blanking period of the video signal can be adjusted.

Additional features and advantages are described herein, and will be apparent from the following Detailed Description and the figures.

BRIEF DESCRIPTION OF THE FIGURES

FIGS. 7A to 7C are views illustrating a timing at which the video signal is written into the memory, and timings at which the video signal is read and displayed;

FIGS. 10A to 10C are views illustrating a timing at which the video signal is written into the memory, and timings at which the video signal is read and displayed;

FIGS. 11A to 11C are views illustrating a timing at which the video signal is written into the memory, and timings at which the video signal is read and displayed;

FIGS. 12A to 12C are views illustrating a timing at which the video signal is written into the memory, and timings at which the video signal is read and displayed;

FIGS. 15A and 15B are views illustrating a state in which a blanking period is increased;

FIGS. 17A to 17C are views illustrating a case in which the touch detection drive signal is applied to the blanking period in the lateral direction.

DETAILED DESCRIPTION

Hereinafter, the best mode (hereinafter, referred to as an embodiment) used to implement the present disclosure will be described with reference to the accompanying drawings. In addition, the description will be performed in order below.

1. Embodiment

Example of Configuration of Display Apparatus

Figure 1:
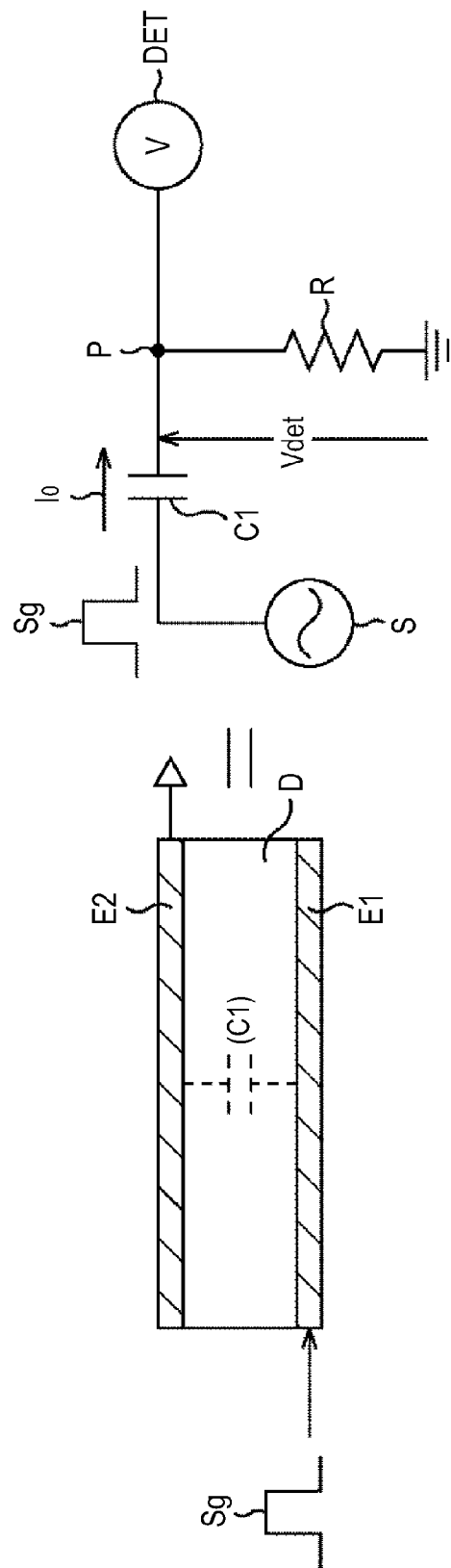
FIGS. 1A and 1B are views illustrating a principle of a capacitance type touch panel.
Figure 2:
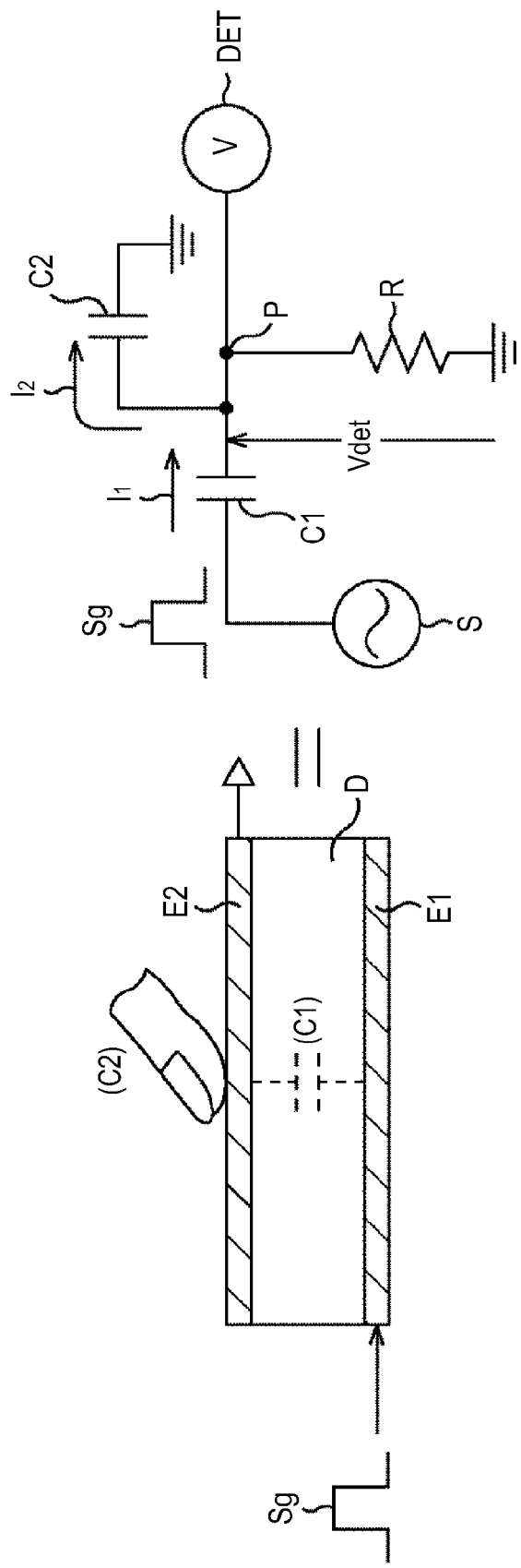
FIGS. 2A and 2B are views illustrating the principle of a capacitance type touch panel.
Figure 3:
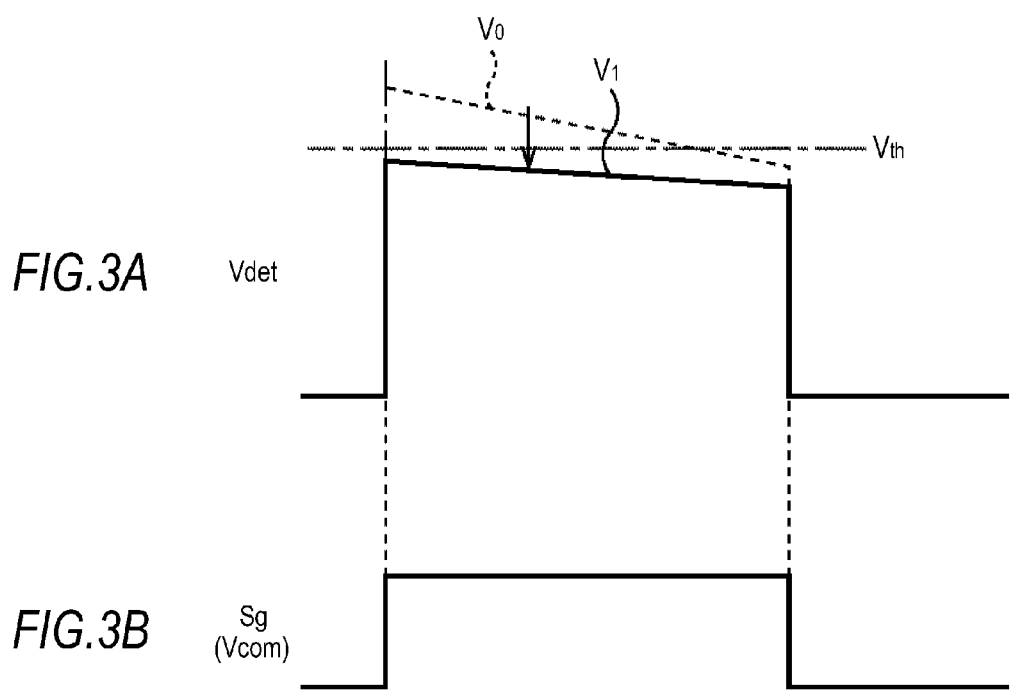
FIGS. 3A and 3B are views illustrating the principle of a capacitance type touch panel.
Figure 4:
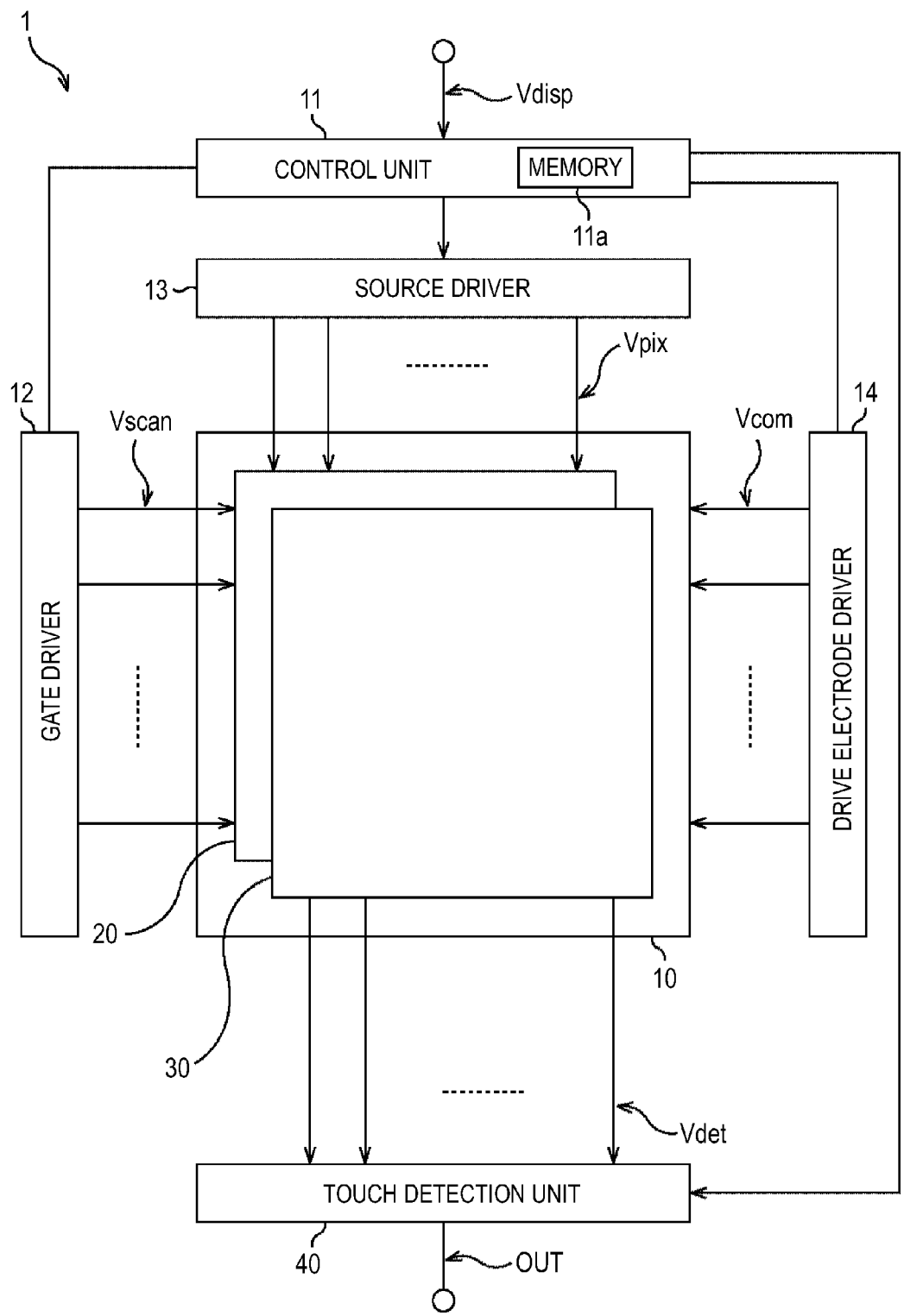
FIG. 4 is a block diagram illustrating an example of the configuration of a touch detection function-attached display apparatus to which an embodiment of the present disclosure is applied.

FIG. 4 shows an example of the configuration of a display apparatus according to an embodiment of the present disclosure.

A display apparatus 1 integrates a capacitance type touch panel with a display, and uses a common display electrode of the display as one of a pair of detection electrodes E1 and E2 for touch detection.

The display apparatus 1 includes a control unit 11, a gate driver 12, a source driver 13, a drive electrode driver 14, a touch detection function-attached display device 10, and a touch detection unit 40.

The touch detection function-attached display device 10 includes a liquid crystal display device 20 and a touch detection device 30.

The control unit 11 supplies a control signal to each of the gate driver 12, the source driver 13, the drive electrode driver 14, and the touch detection unit 40 based on a video signal Vdisp which is supplied from the outside, and performs control such that these units are operated in synchronization with each other. Further, the control unit 11 includes a built-in memory 11a which has a capacity of M % (M is an arbitrary value. In the embodiment, M=10) of the video signal Vdisp of 1 frame, and the video signal Vdisp which is supplied from the outside is written into a memory 11a in accordance with a synchronization signal Vsync or Hsync. In addition, the video signal Vdisp which is written into the memory 11a is read using the source driver 13.

Figure 5:
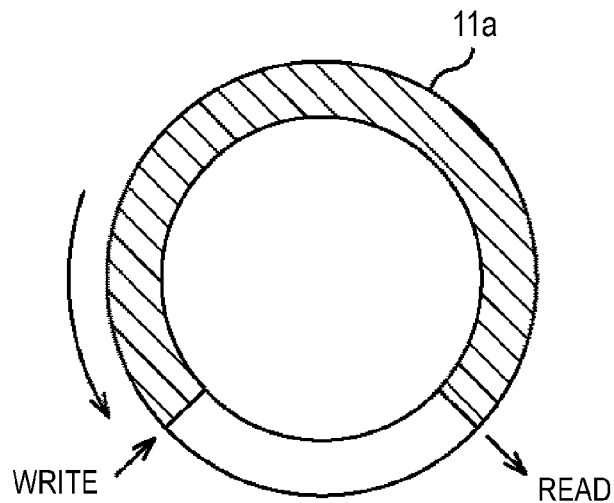
FIG. 5 is a view schematically illustrating the addressing of a memory in which a video signal is written.

FIG. 5 schematically shows the addressing of the memory 11a. The memory 11a includes a plurality of ports in order to independently write or read data (in this case, the video signal Vdisp), and the addressing is set to a ring shape such that a read address follows after a written address. That is, the memory 11a is operated as a ring buffer. In addition, it is not necessary to match a speed at which the video signal Vdisp is read from the memory 11a with a speed at which the video signal Vdisp is written into the memory 11a, and may be varied. The variation width of the reading speed depends on the capacity of the memory 11a, and the fastest reading speed can be increased by M % of the writing speed. In a case of the embodiment, it can be increased by 10%.

Returning to FIG. 4, the gate driver 12 has a function of sequentially selecting a single horizontal line which is a target of the display drive of the touch detection function-attached display device 10 in response to the control signal from the control unit 11. In detail, the gate driver 12 applies a scan signal Vscan to the gate of the TFT devices Tr of pixels Pix through a scan signal line GCL, thereby sequentially selecting a single row (a single horizontal line) of the pixels Pix which are formed in a matrix in the liquid crystal display device 20 of the touch detection function-attached display device 10 as the target of display drive.

The source driver 13 supplies a pixel signal Vpix to each of the pixels Pix of the touch detection function-attached display device 10 in response to the control signal from the control unit 11. In detail, the source driver 13 reads the pixel signal Vpix from the memory 11a, and supplies the pixel signal Vpix to each of the pixels Pix which are included in a single horizontal line which is sequentially selected using the gate driver 12 through the pixel signal line SGL. Thereafter, in these pixels Pix, the single horizontal line is displayed in response to the supplied pixel signal Vpix.

The drive electrode driver 14 supplies a drive signal Vcom to the drive electrodes COML of the touch detection function-attached display device 10 in response to the control signal from the control unit 11. In addition, the drive electrodes COML are formed in a block for each predetermined number of lines, and the drive signal Vcom which includes a display drive signal Vcomd or a touch detection drive signal Vcomt is supplied in units of a block. In detail, the display drive signal Vcomd is applied in a display operation period Pd during which a display operation is performed, and the touch detection drive signal Vcomt is applied in a touch detection operation period Pt during which a touch detection operation is performed.

The touch detection drive signal Vcomt has a frequency which is higher than that of the display drive signal Vcomd, and, for example, can have a frequency ten times higher than the frequency of the display drive signal Vcomd.

The liquid crystal display device 20 performs sequential scanning by a single horizontal line in response to a scan signal Vscan which is supplied from the gate driver 12, and performs display in response to the pixel signal Vpix. The touch detection device 30 performs touch detection by performing sequential scanning by a single detection block in response to the touch detection drive signal Vcomt which is supplied from the drive electrode driver 14 based on the basic principal of the above-described capacitance type touch detection, and outputs a touch detection signal Vdet which is obtained as a result to the touch detection unit 40.

The touch detection unit 40 detects the presence of a touch (the contact of a finger of a user or approach) performed on the touch detection device 30 in response to the control signal from the control unit 11 and based on the touch detection signal Vdet which is input from the touch detection device 30, and outputs the coordinates which are touched.

Description of Operation

Subsequently, a display control process, performed when screen display is performed on the touch detection function-attached display device 10 of the display apparatus 1, will be described with reference to FIGS. 6 to 14C.

Figure 6:
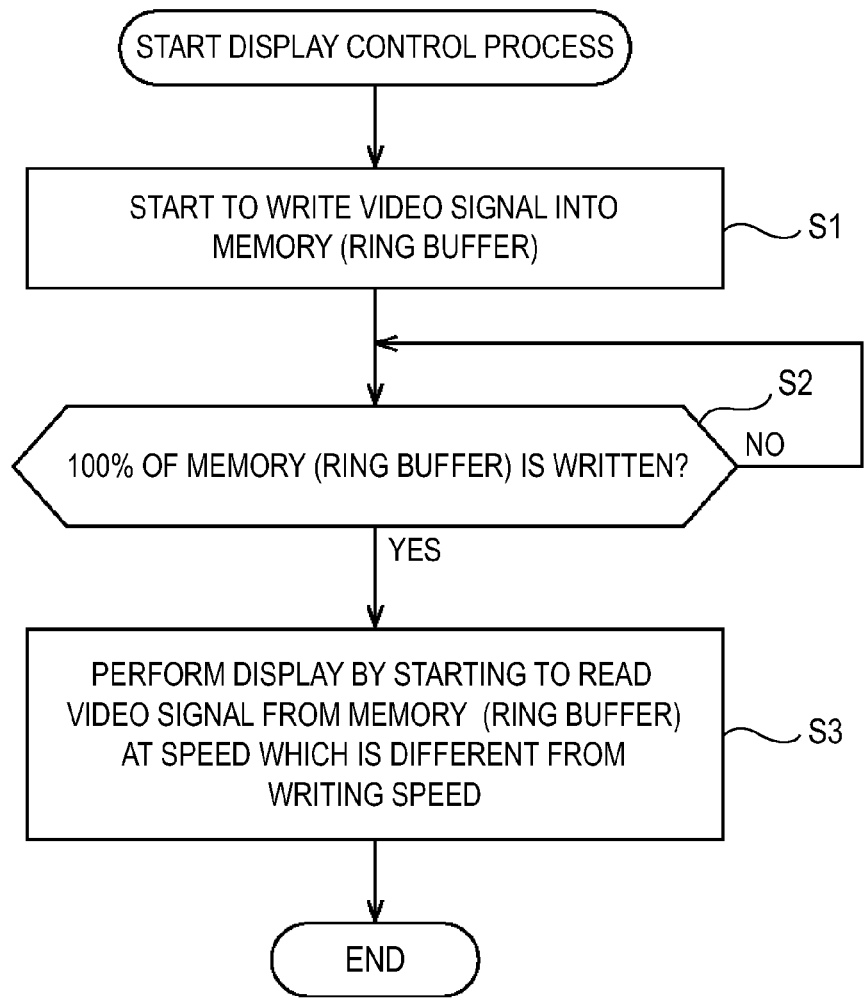
FIG. 6 is a flowchart illustrating a display control process.

FIG. 6 is a flowchart illustrating the display control process. FIGS. 7A, 8A, 9A, 10A, 11A, 12A, 13A, and 14A show screen displays performed in correspondence to the video signal Vdisp which is supplied from the outside. FIGS. 7B, 8B, 9B, 10B, 11B, 12B, 13B, and 14B show screen displays performed in correspondence to the video signal Vdisp which is written into the memory 11a. FIGS. 7C, 8C, 9C, 10C, 11C, 12C, 13C, and 14C show screen displays performed in correspondence to the video signal Vdisp which is read from the memory 11a.

In addition, as described above, the memory 11a has a capacity of 10% of the video signal Vdisp of 1 frame, operates as a ring buffer, and is in a state in which nothing is written as shown in FIGS. 7A to 7C.

Figure 8C:
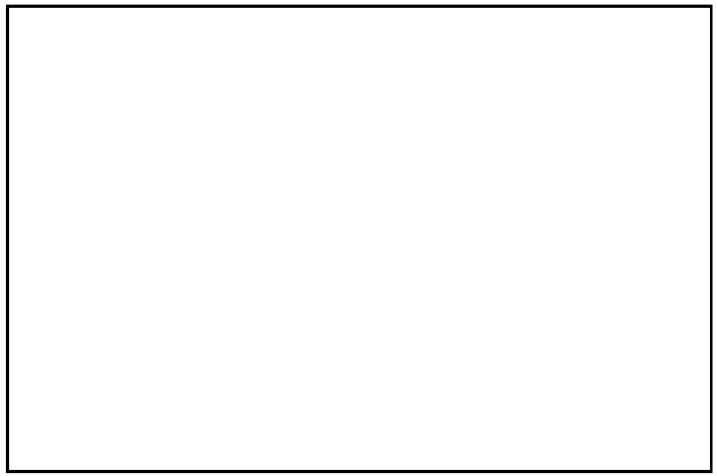
FIGS. 8A to 8C are views illustrating a timing at which the video signal is written into the memory, and timings at which the video signal is read and displayed.
Figure 8B:
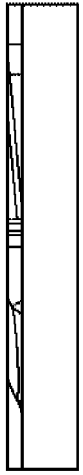
Figure 8A:
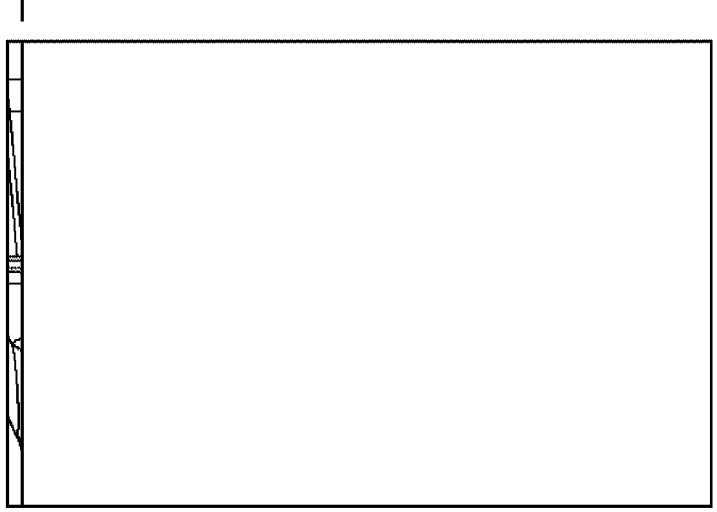

In step S1, the control unit 11 starts to write the video signal Vdisp, which is supplied from the outside, into the memory 11a. Therefore, as shown in FIGS. 8A to 8C, the video signal Vdisp is accumulated in the memory 11a for each single horizontal line.

Figure 9C:
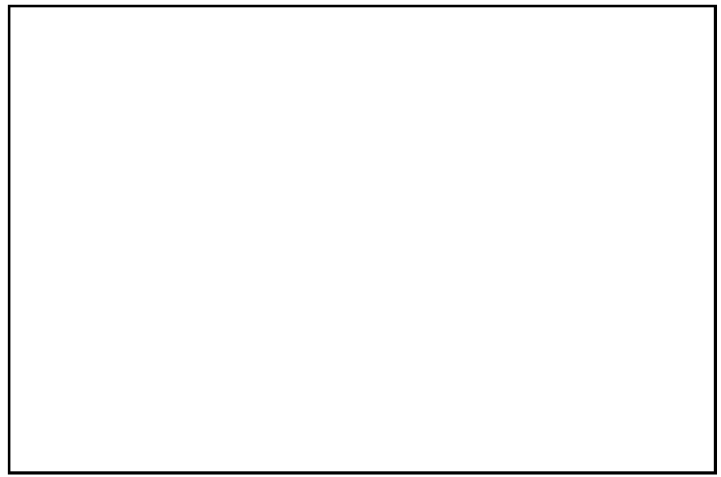
FIGS. 9A to 9C are views illustrating a timing at which the video signal is written into the memory, and timings at which the video signal is read and displayed.
Figure 9B:
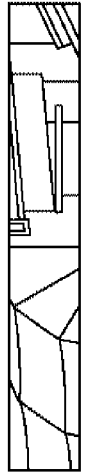
Figure 9A:
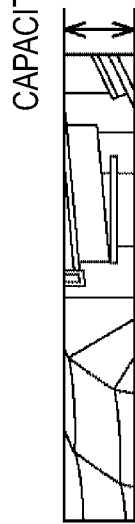
Figure 13C:
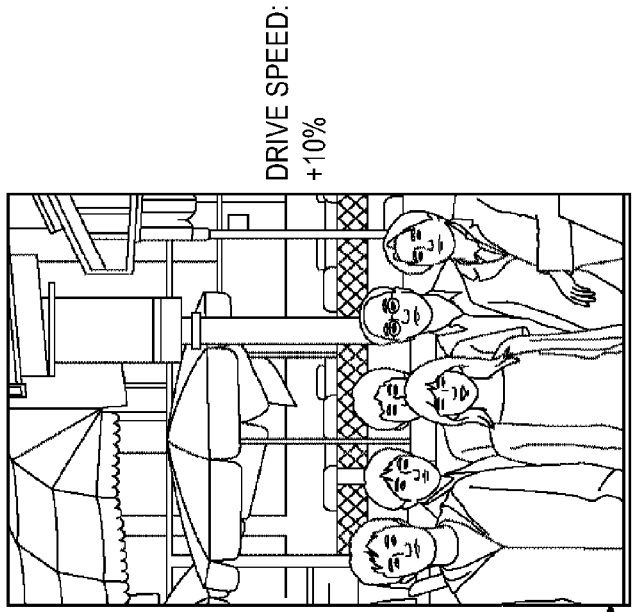
FIGS. 13A to 13C are views illustrating a timing at which the video signal is written into the memory, and timings at which the video signal is read and displayed.
Figure 13B:
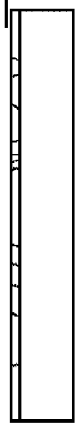
Figure 13A:
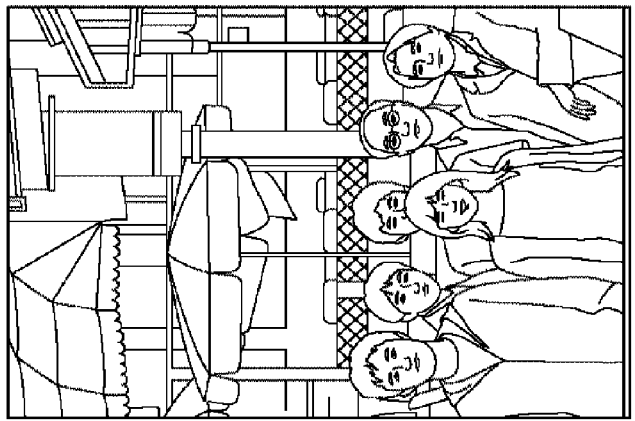

In step S2, the control unit 11 waits for the video signal Vdisp to be written until the capacity of the memory 11a is full, and notifies the source driver 13 of the information when the video signal Vdisp is written until the capacity of the memory 11a is full, as shown in FIGS. 9A to 9C.

In step S3, the source driver 13 starts to read the video signal Vdisp from the memory 11a at a speed of 110% of the writing speed according to the notification from the control unit 11, as shown in FIGS. 10A to 10C. Further, the source driver 13 synchronizes the pixel signal Vpix in units of a single horizontal line with the synchronization signal Hsync, which is 1.1 times faster than the input time, in response to the video signal Vdisp, and supplies the resulting pixel signal Vpix to each of the pixels Pix of the touch detection function-attached display device 10. Therefore, the screen display in units of a single horizontal line of the touch detection function-attached display device 10 starts at a speed which is 1.1 times faster than the input time.

Figure 14C:
FIGS. 14A to 14C are views illustrating a timing at which the video signal is written into the memory, and timings at which the video signal is read and displayed.
Figure 14B:
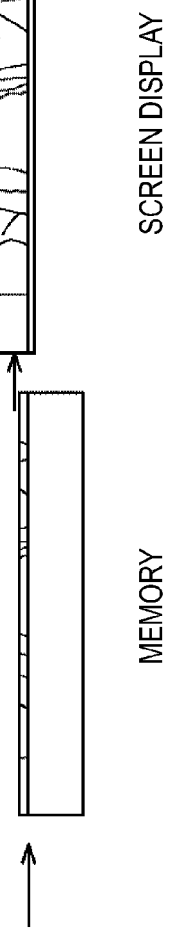
Figure 14A:
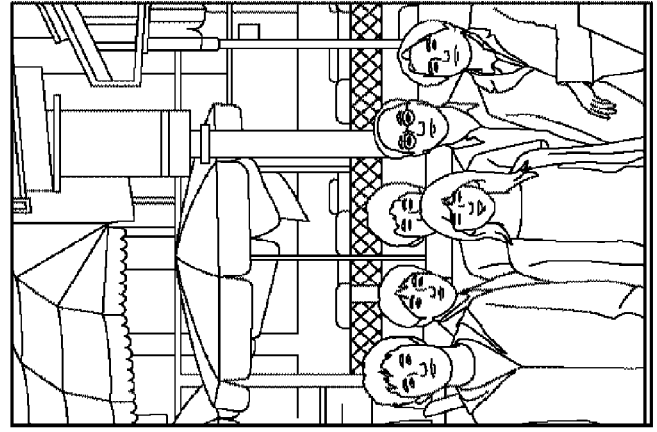

As described above, the input video signal Vdisp is read after the input video signal Vdisp is written into the memory 11a, and the pixel signal Vpix in units of a single horizontal line is displayed on the touch detection function-attached display device 10 based on the read input video signal Vdisp. In addition, since setting is made such that the reading speed from the memory 11a is faster than the writing speed, the proportion of the video signal Vdisp which occupies the memory 11a decreases thereafter, as sequentially shown in FIGS. 11A to 13C. Further, as shown in FIGS. 14A to 14C, at a stage in which the pixel signal Vpix of 1 frame is input, the entire pixel signal Vpix which occupies the memory 11a is read, and the screen display of a single frame is terminated. That is, when viewed at a stage in which a final horizontal line of 1 frame is displayed, the frame rate of an input image and a display image is maintained.

FIGS. 15A and 15B show a state in which a blanking period is increased using the above-described display control process, FIG. 15A shows a synchronization timing of the video signal Vdisp which is supplied to the control unit 11 from the outside, and FIG. 15B shows a display timing of the screen display corresponding to the video signal Vdisp in units of a single horizontal line. In addition, here, the number of horizontal lines of the video signal Vdisp is 480.

In a display control process, since display is performed by reading the video signal Vdisp at a speed which is 10% faster than the writing speed with respect to the memory 11a as described above, it is possible to increase the blanking period while maintaining the frame rate.

Figure 16A:
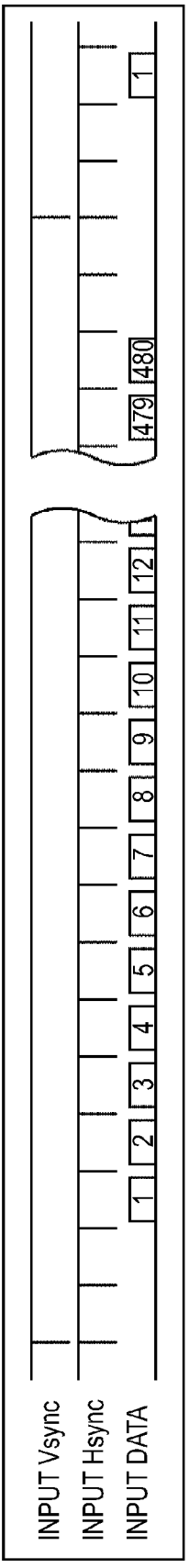
FIGS. 16A to 16C are views illustrating a case in which a touch detection drive signal is applied to the blanking period in the longitudinal direction.
Figure 16B:
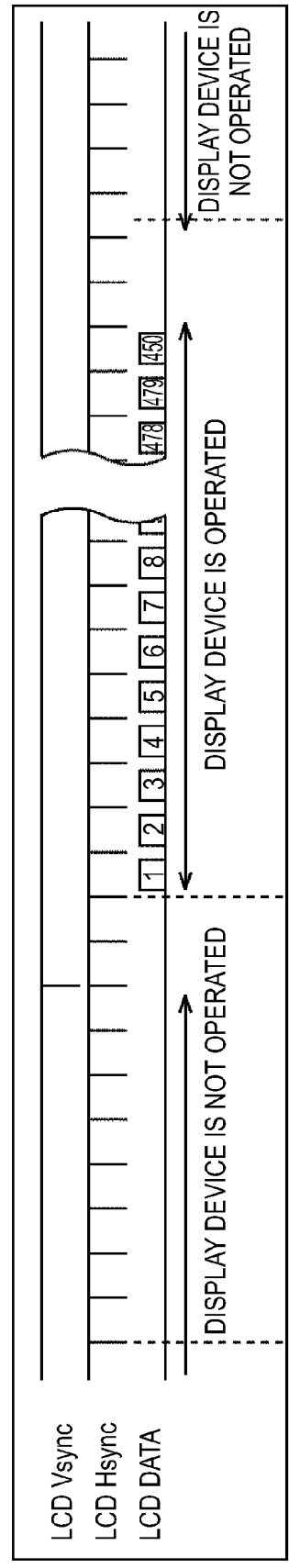
Figure 16C:
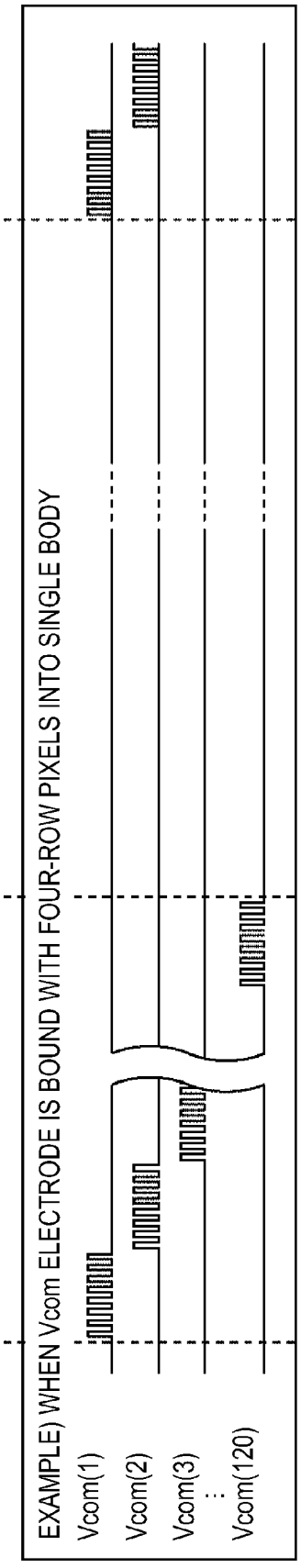

In addition, the blanking period, from when the video signal Vdisp is supplied and starts to be written into the memory 11a to when the video signal Vdisp starts to be read, is the non-operation period of the touch detection function-attached display device 10. Therefore, as shown in FIG. 16C, the non-operation period of the touch detection function-attached display device 10 is used as the touch detection operation period Pt during which the touch detection operation is performed, thus the touch detection drive signal Vcomt can be applied to the drive electrodes COML which are formed in a block. In addition, in this case, since the touch detection operation period Pt has latitude, it is possible to easily convert the frequency of the touch detection drive signal Vcomt into a frequency which is not affected by noise.

However, as shown in FIG. 17C, the touch detection drive signal Vcomt may be applied at every single synchronization signal Hsync.

However, although so far the blanking period is increased by providing the memory 11a and increasing the reading and displaying speed of the video signal Vdisp, on the contrary, the reading and displaying speed of the video signal Vdisp may be reduced by reducing the blanking period.

Figure 18A:
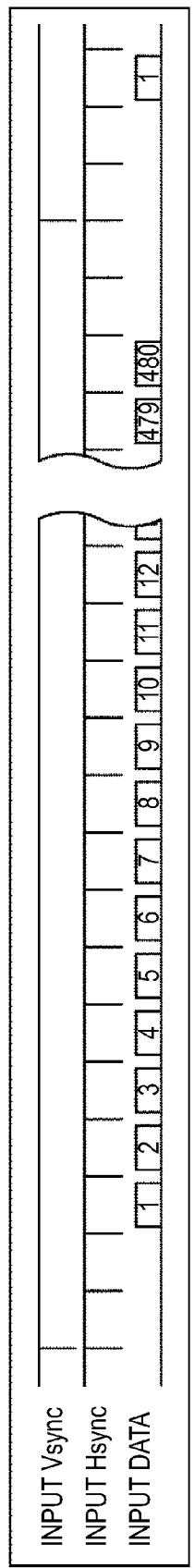
FIGS. 18A and 18B are views illustrating a state in which the blanking period is reduced.
Figure 18B:
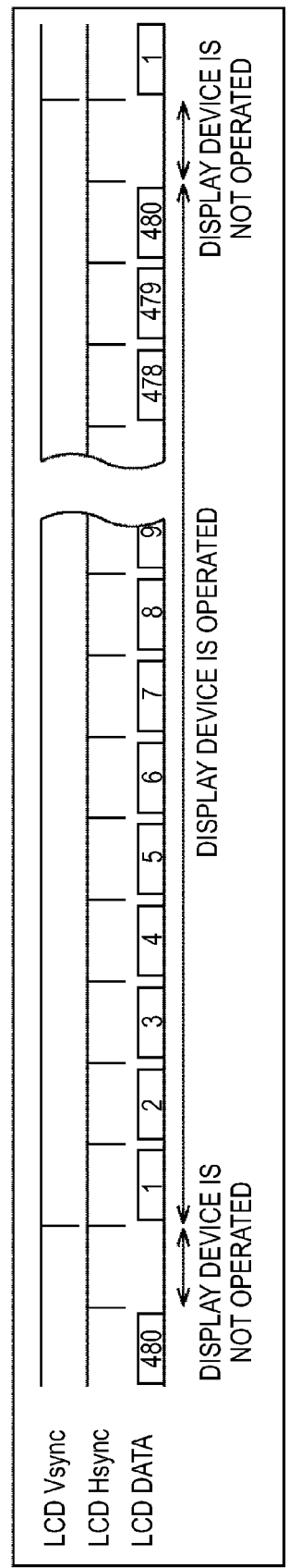

FIGS. 18A to 18B show a state in which the reading and displaying speed of the video signal Vdisp is reduced by reducing the blanking period. FIG. 18A shows a synchronization timing of the video signal Vdisp which is supplied to the control unit 11 from the outside, FIG. 18B show a display timing of the screen display corresponding to the video signal Vdisp in units of a single horizontal line. In addition, here, the number of horizontal lines of the video signal Vdisp is 480.

In a state shown in FIGS. 18A and 18B, the touch detection drive signal Vcomt can be applied in the blanking period thereof as the same as FIGS. 16A to 16C or FIGS. 17A to 17C.

As described above, since the blanking period can be adjusted in the display apparatus 1 according to the embodiment, the touch detection drive signal Vcomt can be applied to the drive electrodes COML in the blanking period, and the frequency of the touch detection drive signal Vcomt can be adjusted. Therefore, it is possible to prevent the accuracy of the touch detection from being reduced due to the external noise or the like.

In addition, the embodiments of the present disclosure are not limited to the above-described embodiment, and various types of modifications are possible without departing from the gist of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus comprising:
a display that displays a screen corresponding to a video signal, the display includes a plurality of pixels;
a control unit configured to write the video signal into a memory at a predetermined writing speed according to a synchronization signal;
a source driver configured to
read a pixel signal of one horizontal line based on the video signal which is written into the memory, at a reading speed which is faster than the writing speed according to a control signal from the control unit,
supply the pixel signal to each of the plurality of pixels, and
display the read video signal on the display; and
a capacitance type touch panel configured to be layered on the display and detect a touch operation,
wherein the memory has a capacity which is smaller than the video signal of one frame, includes a write address and a read address, the addressing of which is formed in a ring shape, and independently writes and reads the video signal at different speeds,
wherein the control unit controls the source driver to start reading the video signal when the video signal is written to fill a full capacity of the memory, allowing the touch panel to detect the touch operation in a blanking period, and
wherein, when the capacity of the memory is 10% of the video signal of the single frame, the source driver reads the video signal which is written into the memory at a reading speed which is increased by 10% of the writing speed, and displays the video signal on the display.

2. A display method of a display apparatus which includes a display that displays a screen corresponding to a video signal, the display includes a plurality of pixels, comprising:
writing the video signal into a memory at a predetermined writing speed according to a synchronization signal by a control unit; and
reading a pixel signal of one horizontal line based on the video signal which is written into the memory, at a reading speed which is faster than the writing speed according to a control signal from the control unit by the source driver;
supplying the pixel signal to each of the plurality of pixels by the source driver; and
displaying the read video signal on the display by the source driver,
wherein the memory has a capacity which is smaller than the video signal of one frame, includes a write address and a read address, the addressing of which is formed in a ring shape, and independently writes and reads the video signal at different speeds,
wherein the control unit controls the source driver to start reading the video signal when the video signal is written to fill a full capacity of the memory, allowing the touch panel to detect a touch operation in a blanking period, and
wherein, when the capacity of the memory is 10% of the video signal of the single frame, the source driver reads the video signal which is written into the memory at a reading speed which is increased by 10% of the writing speed, and displays the video signal on the display.

* * * * *